No. 769,917. PATENTED SEPT. 13, 1904.
W. G. PRICHARD.
SHEARING MACHINE.
APPLICATION FILED JUNE 20, 1904.
NO MODEL. 2 SHEETS—SHEET 1.
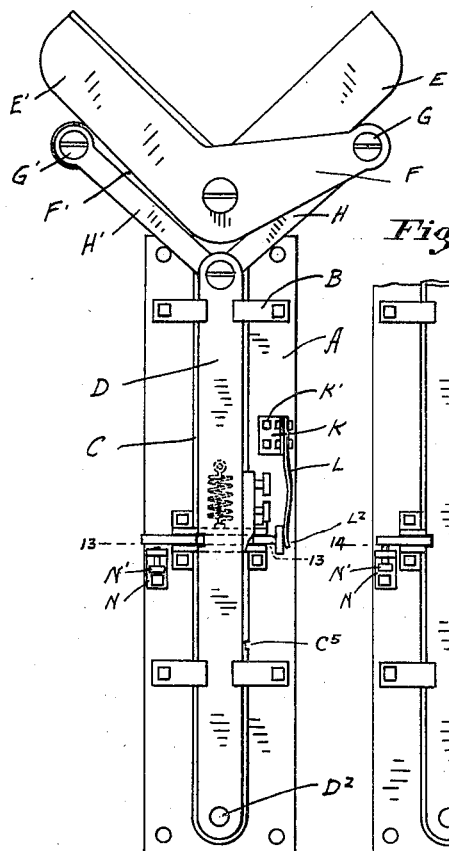
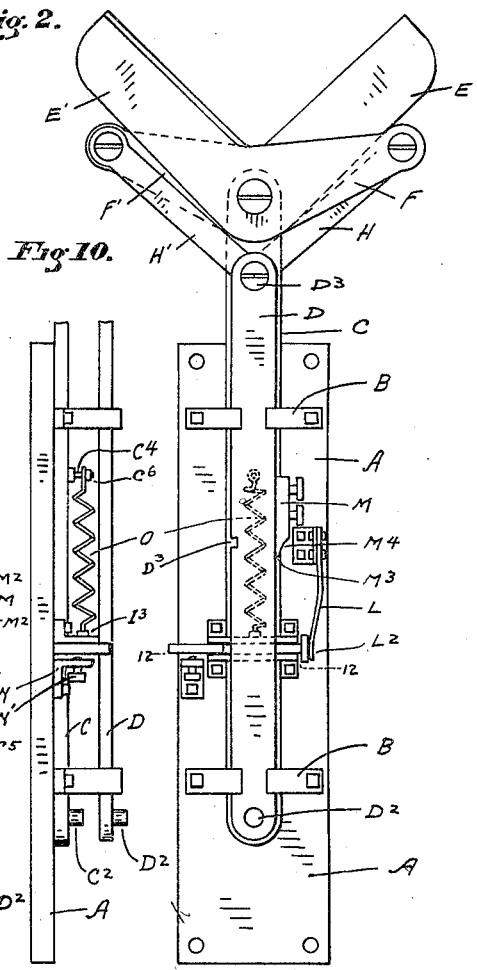
WITNESSES: INVENTOR.
John J. Hartley William G. Prichard
Clara A. Priddy BY Thomas L. Ryan
ATTORNEY.

No. 769,917. PATENTED SEPT. 13, 1904.
W. G. PRICHARD.
SHEARING MACHINE.
APPLICATION FILED JUNE 20, 1904.
NO MODEL. 2 SHEETS—SHEET 2.
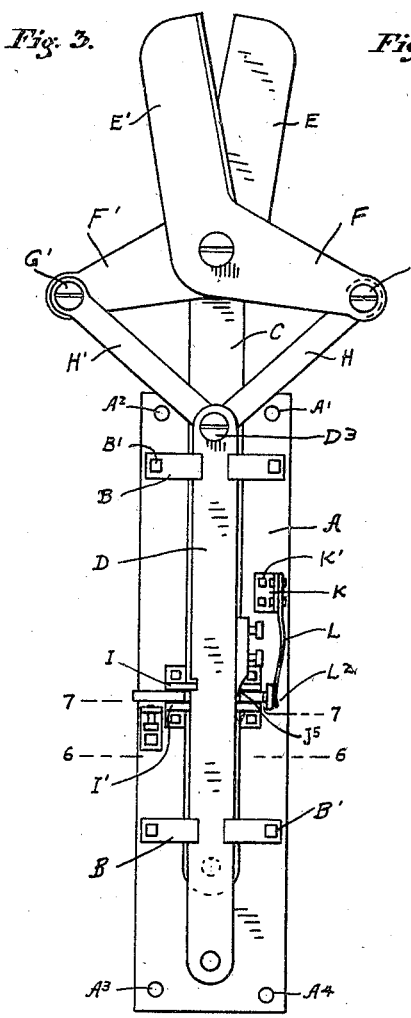
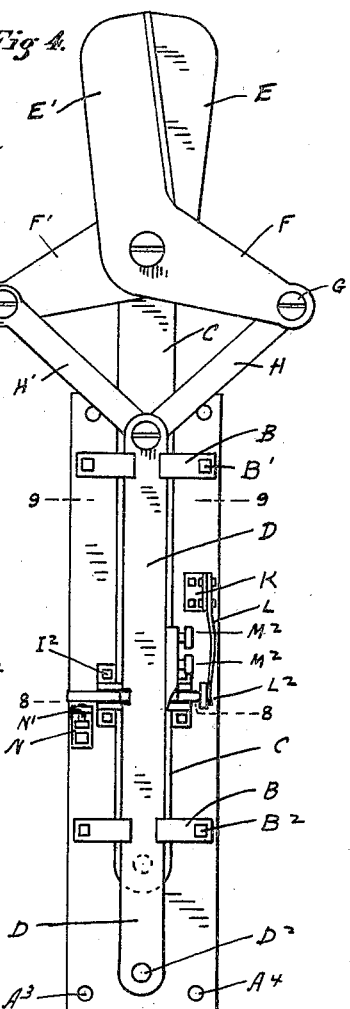
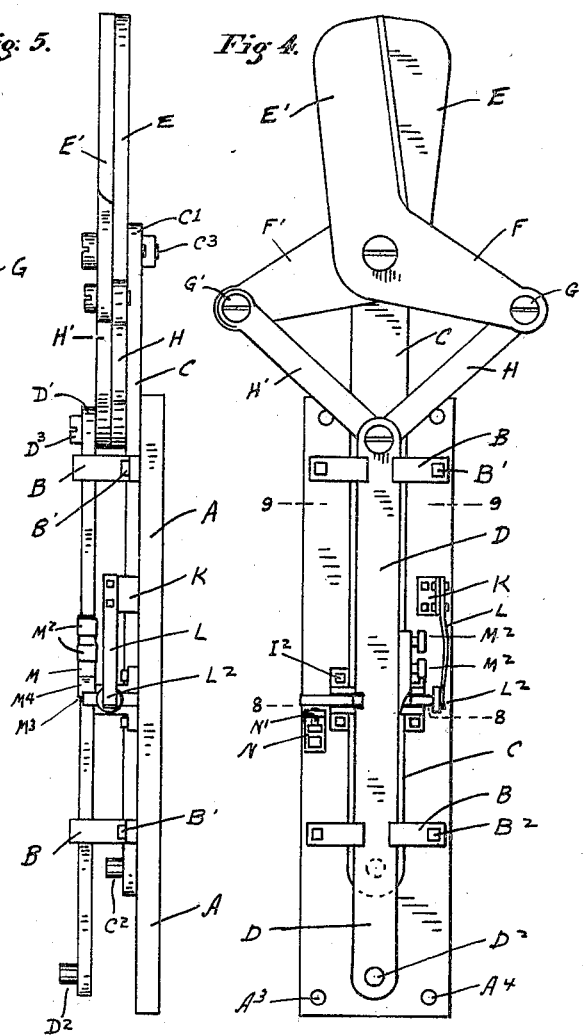
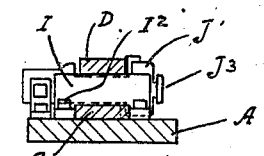
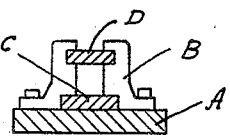
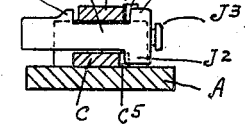
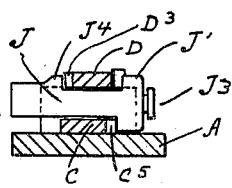
WITNESSES: John J. Hartley, Clara A. Priddy
INVENTOR. William G. Prichard
BY Thomas L. Ryan
ATTORNEY.

No. 769,917.	Patented September 13, 1904.

UNITED STATES PATENT OFFICE.

WILLIAM G. PRICHARD, OF MUNCIE, INDIANA, ASSIGNOR OF ONE-HALF TO GARRETT O. DRISCOLL, OF MUNCIE, INDIANA.

SHEARING-MACHINE.

SPECIFICATION forming part of Letters Patent No. 769,917, dated September 13, 1904.

Application filed June 20, 1904. Serial No. 213,267. (No model.)

*To all whom it may concern:*

Be it known that I, WILLIAM G. PRICHARD, a citizen of the United States, residing at Muncie, in the county of Delaware and State of Indiana, have invented a new and useful Shearing-Machine, of which the following is a specification.

My invention relates to improvements in shears, with especial reference to shears for shearing or clipping glass; but it is obviously applicable to many other purposes.

The objects of my improvements are, first, to afford simple means for projecting the shears a given distance from its support and for operating same in that position, and after its operation for the automatic and speedy return of the same from its projected to its original position; second, to afford means for simultaneously projecting and operating said shears throughout its travel of a given distance from its position of repose and after such operation of the same for the speedy return of the same to its original position, and, third, to provide simple means for the proper adjustment of the shear-blades without removing them from the machine. I accomplish these objects by the mechanism illustrated in the accompanying drawings, forming a part of this specification, wherein similar letters of reference indicate similar parts throughout the several views, and in which—

Figures 1, 2, 3, and 4 are front views showing my machine and the various positions assumed by its parts in its operation. Fig. 5 is a side view of the same as shown in Fig. 3. Fig. 6 is a cross-section on the line 6 6, Fig. 3. Fig. 7 is a cross-section on the line 7 7, Fig. 3. Fig. 8 is a cross-section on the line 8 8, Fig. 4. Fig. 9 is a cross-section on the line 9 9, Fig. 4. Fig. 10 is a side view, with shears omitted, of the machine, as shown in Fig. 2. Fig. 11 is a front view of machine with shears omitted, showing driver-bar locked in position. Fig. 12 is a cross-section on line 12 12, Fig. 2. Fig. 13 is a cross-section on the line 13 13, Fig. 1; and Fig. 14 is a cross-section on the line 14 14, Fig. 11.

In the drawings, A designates the base-plate, provided with the holes $A'$, $A^2$, $A^3$, and $A^4$, adapted to receive bolts for fastening the same to support or to a machine. Rigidly secured to the base-plate by means of the bolts $B'$ are the guide-blocks B, adapted to serve as guides for the carrier-bar C and the driver-bar D. Slidingly secured by the guide-blocks B and resting longitudinally upon the base-plate is the carrier-bar C, having at its inner end the stud $C^2$ and at its outer end, (designated $C'$,) the shouldered pin $C^3$. Positioned directly above the carrier-bar longitudinally and parallel and slidingly secured by the guide-blocks B is the driver-bar D, upon the inner end of which is the stud $D^2$. At the outer end of the driver-bar is the head $D'$ and the shouldered pin $D^3$. Pivotally secured to the carrier-bar by means of the shouldered pin $C^3$ are the shear-blades E and $E'$, having outwardly-extending legs F and $F'$, the outer ends of which legs are movably connected, by means of the bolts G and $G'$, to the outer ends of the connecting-bars H and $H'$. The inner ends of the connecting-bars are each movably connected to the head $D'$ of the driver-bar by means of the shouldered pin $D^3$.

Rigidly secured transverse the base-plate A and parallel to each other by means of the bolts $I^2$ are the guide-bars I and $I'$ with apertures in their bottoms forming guides for carrier-bar C. These guide-bars are positioned apart, as plainly shown in the several views, and between the same is slidingly secured the trip J, having the upwardly-extending tooth $J'$, the downwardly-extending tooth $J^2$, the outwardly-extending head $J^3$, and the rearward tooth $J^4$. The upwardly-extending tooth $J'$ of the trip has its edge which faces the shears beveled slightly, as shown in the several views.

K designates a standard which is rigidly secured, by means of the bolts $K'$, to the base-plate. Secured rigidly to this standard is the spring L, extending inwardly, with its extreme end $L^2$ curved slightly and adapted to bear movably and firmly against the head $J^3$ of the trip J, pressing the trip inwardly and against the edge of the carrier-bar C.

Adjustably secured to the driver-bar D by means of the set-screws $M^2$ is the actuating-lug M, having blunt point M³ and concavely-sloping portion M⁴ adapted to actuate the trip J in the operation of the machine.

N designates a standard rigidly secured to the base-plate, in the upwardly-extending portion of which is provided the set-screw N', adapted to be adjusted firmly against the trip J when it is desired in the operation of the shears to lock the driver-bar in the fixed position, as shown in Fig. 11.

Secured to the stud I³ of the guide-bar I is the coil-spring O, the opposite and outer end of which is detachably secured to the stud C⁴ of the carrier-bar C, as plainly shown in Fig. 1, Fig. 2, and Fig. 10.

The machine when in readiness for operation is in the position as shown in Fig. 1, the carrier-bar by means of the coil-spring being strained inwardly, the shear-blades standing apart, the inward edges of legs of same resting firmly against the outward edges of the connecting-bars. The tooth J' of the trip J by the pressure of spring L bears firmly against the concavely-sloping portion M⁴ of the actuating-lug M, which sustains tooth J² of trip J free from contact with carrier-bar C. At the stud D² a reciprocating motion is imparted to the driver-bar D, which in its outward movement projects the shearing mechanism through the given distance. The trip J moves transversely and inwardly until the tooth J² of same bears firmly against the edge of the carrier-bar C, and coincidently with the arrival of the driver-bar at the end of its travel tooth J² of the trip J slips into the aperture C⁵ of the carrier-bar, thus locking the carrier-bar supporting the shearing mechanism firmly in the position as shown in Fig. 2. The shearing mechanism is then in readiness for operation. Driver-bar having reached the end of its travel outward then moves in the opposite direction, in its inward progress operating the shears by means of the connecting-rods H and H' and the shear-legs F and F', as plainly shown in Fig. 3. As the driver-bar progresses farther and reaches the end of its travel the blunt point M³ of the actuating-lug M enters the space between carrier-bar C and the edge J⁵ of the tooth J' and forces outwardly on the concavely-sloping portion M⁴ the tooth J² of trip J from the aperture C⁵ of the carrier-bar, releasing the carrier-bar, which, together with the shearing mechanism, by means of the strained coil-spring O is instantly drawn inwardly, the shear-blades separating or opening as they recede and the parts all assuming their original positions, as shown in Fig. 1. Thus the shears is removed from the location of the glass or other material to be sheared or clipped and admit of being cooled by water or other process without effect or injury to the material to be operated upon. When it is desired to obtain a shearing rather than a clipping operation, the trip J is set by the operative in the position as shown in Fig. 11, the tooth J⁴ of the trip J inserted in the aperture D³ of the driver-bar D, thus locking same securely. The reciprocating motion is then imparted to the carrier-bar at the stud C², which carrier-bar in its movement outwardly coincidently with its progress operates the shears, bringing the cutting edges of the blades gradually toward and past each other, completing the shearing operation simultaneously with the completion of the outward travel of the carrier-bar. The opposite movement of the carrier-bar then reopens the shear-blades and simultaneously with the completion of its inward travel replaces the shearing mechanism parts in their original position, as plainly shown in Fig. 11. It is obvious that the coil-spring O in the operation just described performs no function, and I have provided the nut C⁶ for the stud C⁴, by the removal of which the outward end of the coil-spring may be detached. By placing the actuating-lug M inwardly or outwardly along the edge of the driver-bar by means of the set-screws M², I obtain, respectively, a greater or lesser lap of each over the other of the cutting edges of the shear-blades.

By means of the foregoing-described mechanism I am enabled by the application to same of simply a reciprocating motion with travel of given distance to either the driver or carrier bar, as the case may be, to project from its point of support the shears a given distance to the glass or other material to be sheared, lock the carrying and supporting mechanism in position, operate the shears, and immediately after the operation of same return the same instantly through the given distance to original position of readiness for another complete operation, or to project from its point of support the shears a given distance to the glass or other material to be sheared, performing the shearing operation as the mechanism progresses, complete the operation simultaneously with the completion of the travel by the carrier-bar, and return the shearing mechanism speedily through the given distance to original position of readiness for another complete operation, and also I accomplish the simple means for the adjustment of the cutting edges of the shear-blades necessary on account of wear without removing same or any part thereof from the machine and without effecting change or alteration in any manner of the mechanism.

I am aware that many minor changes can be made in the construction and arrangement of the parts of this machine without in the least departing from the nature and principles of my invention.

Having thus described my invention, what I claim as new, and desire to secure by Letters Patent, is—

1. In a shears, the combination of a longitudinally-reciprocating carrier therefor, means for imparting an outward movement to said carrier, means for operating the shears when the carrier is at the end of its outward travel, and means for imparting a quick inward movement to the carrier at the end of the shearing operation.

2. In a shears, the combination of a longitudinally-reciprocating carrier therefor, held in a normal inward position by a spring, means for moving the carrier to an outward position thereby straining the spring, means for locking the carrier in said outward position, means for operating the shears when the carrier is in said outer position, and means for unlocking the carrier at the end of the shearing operation whereupon it is returned to normal inward position by said spring.

3. The combination, in a shears, with a longitudinally-reciprocating carrier therefor, a yielding means for holding it in a normal inward position, means to temporarily overcome said holding means whereby said carrier is moved to an outward position, means for holding it in the outer position, means for operating said shears while the carrier is in said outer position, and means for releasing said temporary holding means at the end of the shearing operation.

4. In a shears, the combination with a longitudinally-reciprocating carrier therefor, a reciprocating bar having longitudinal movement parallel with but independent of said carrier, said bar being connected with the legs of said shears whereby the shear-blades will be opened and the carrier moved to its outer position by the outward movement of said bar, means for locking the carrier in its outer position, means for returning the said bar thereby operating the shears, a trip operated by said bar on its return at the end of the shearing operation, to unlock the carrier, and means for returning the carrier to its normal inward position when unlocked.

5. In a shears, the combination with a longitudinally-reciprocating carrier therefor and means for holding the legs of the shears pivotally whereby the shear-blades will be closed by the outward movement and opened by the inward movement of the carrier.

6. In a shears, the combination with a longitudinally-reciprocating carrier therefor, means for imparting an outward and inward movement to said carrier, means for operating the shears, a reciprocating bar having longitudinal movement parallel with but independent of said carrier, said bar being connected with the legs of said shears whereby the shear-blades will be opened and the carrier moved to its outer position by the outward movement of said bar and means for adjusting the position each to the other of the shear-blades, all substantially as set forth.

In testimony whereof I have signed my name to this specification in the presence of two subscribing witnesses.

WILLIAM G. PRICHARD.

Witnesses:
   JOHN J. HARTLEY,
   CLARA A. PRIDDY.